Figure 1A:
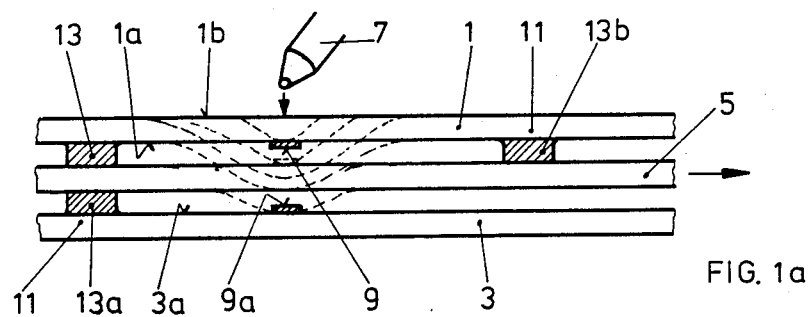

United States Patent [19]

Wörndli

[11] Patent Number: 4,871,193

[45] Date of Patent: Oct. 3, 1989

[54] PROCESS FOR IRREVERSIBLE RECORDING, RECORDING CARRIER, AS WELL AS USE OF THE PROCESS OR OF THE RECORDING CARRIER

[76] Inventor: Gerhard A. Wörndli, Lerrhenbühlstrasse 14, 6045 Meggen, Switzerland

[21] Appl. No.: 95,155

[22] PCT Filed: Dec. 19, 1985

[86] PCT No.: PCT/CH85/00177

§ 371 Date: Nov. 18, 1987

§ 102(e) Date: Nov. 18, 1987

[87] PCT Pub. No.: WO87/03990

PCT Pub. Date: Jul. 2, 1987

[51] Int. Cl.⁴ .................... B42D 11/00; B42D 15/00; B41L 1/16; D21H 1/02
[52] U.S. Cl. ........................................ 283/72; 283/70; 282/28 R; 428/40
[58] Field of Search ................. 282/28 R, 29 R, 8 A, 282/28 A, 27.5; 283/70, 71, 72; 150/132; 428/40, 78, 192, 41

[56] References Cited

U.S. PATENT DOCUMENTS

| | | | |
|---|---|---|---|
| 2,788,590 | 5/1957 | Ormsby | 35/48 |
| 3,111,407 | 11/1963 | Lindquist et al. | 282/28 R |
| 3,360,027 | 12/1967 | Price | 150/38 |
| 3,400,470 | 9/1968 | Ritter | 35/9 |
| 3,435,192 | 3/1969 | Hartney | 282/28 R |
| 3,481,759 | 12/1969 | Ostlib | 282/28 R |
| 3,893,714 | 7/1975 | Paulson et al. | 282/28 R |
| 3,900,642 | 8/1975 | Michel | 282/29 R |
| 4,116,469 | 9/1978 | Harriman et al. | 283/72 |
| 4,248,919 | 2/1981 | Davis | 428/40 |
| 4,576,399 | 3/1986 | White et al. | 283/70 |

FOREIGN PATENT DOCUMENTS

| | | |
|---|---|---|
| 341372 | 2/1978 | Austria . |
| 123614 | 12/1972 | Denmark . |
| 135513 | 5/1977 | Denmark . |
| 2038365 | 2/1972 | Fed. Rep. of Germany . |
| 1797335 | 5/1972 | Fed. Rep. of Germany . |
| 1797418 | 5/1972 | Fed. Rep. of Germany . |
| 2531331 | 1/1977 | Fed. Rep. of Germany . |
| 2127828 | 3/1977 | Fed. Rep. of Germany . |

Primary Examiner—Frank T. Yost
Assistant Examiner—Paul M. Heyrana
Attorney, Agent, or Firm—Antonelli, Terry & Wands

[57] ABSTRACT

In order, for example to produce solution noting/-check-out sheets, such as are used in correspondence courses, so that a sheet of writing paper can be written on externally only up to the time when information concerning the correct solution to the problem is made known to the person writing on it, a sheet of writing paper comprises two sheets (1, 3) joined together on three edges (15) and an intermediate sheet (5). The intermediate sheet (5) ensures that when the paper is written on in a writing area (17) the information is transferred to one of the sheets (1, 3). An adhesive place (11) is provided between the sheets (1, 3) which does not adhere to the intermediate sheet (5) but indissolubly binds the two sheets (1, 3) when the intermediate sheet is removed. Located in an information area (19) is the correct solution, which cannot be seen while an intermediate sheet is inserted (15), so that the user can learn the correct solution only after the intermediate sheet (5) has been withdrawn, at a moment when the adhesive place (11) is already activated and therefore any correction and/or completion in the writing area (17) is rendered impossible.

15 Claims, 3 Drawing Sheets

U.S. Patent    Oct. 3, 1989    Sheet 3 of 3    4,871,193

PROCESS FOR IRREVERSIBLE RECORDING, RECORDING CARRIER, AS WELL AS USE OF THE PROCESS OR OF THE RECORDING CARRIER

The present invention relates to a process for irreversible recording, using two sheets joined one above the other, and at least one intermediate sheet which provides the contrast for recording, the record being written on one and/or the other of the two sheets and the intermediate sheet producing an image of the record on at least one of, the mutually facing sheets, preferably on at least one of the sides of the sheets facing each other. Further, the present invention relates to a recording carrier with a first sheet and a second sheet, joined one above the other as well as with at least one interposed intermediate sheet producing the contrast for recording. In addition, the present invention relates to utilization of the process or of the recording carrier for recording carriers wherein it is to be made impossible to alter a recording once it has been made, such as for documentary forms, study sheets, credit forms, credit cards, etc.

Swiss patent No. CH 611,061 discloses questionnaires with two sheets joined together along three marginal edges. An interleaf, carbon paper, is provided therebetween which can be pulled out in the fourth edge region of the joined sheets. In case of such question papers, the correct solution to a posed problem is printed on one of the sides of the sheets mutually facing each other at the intermediate sheet, and this cannot be recognized from the outside when the intermediate sheet has been inserted. A student solves the posed problem on a solution area specifically provided for this purpose, the student's record being copied onto the side of the sheet imprinted with the correct solution as mentioned above. Thereafter, the student removes the intermediate sheet whereby, on the one hand, the correct solution becomes visible through one of the sheets designed to be transparent, but, on the other hand, corrrection of the solution already entered by the student is made impossible, as follows:

Reinsertion of the intermediate sheet providing the contrast for the recording, in this case carbon paper, is precluded by the feature that the latter is folded, at the pull-out opening, about the edge of one of the sheets and is retained in this position by a reverse fold. Thus, it can only be pulled out around the edge of one of these sheets. Reinsertion of the intermediate sheet beneath the reverse fold and around the edge of one of the sheets is impossible.

This reverse fold is relatively expensive in its manufacture. Additionally provisions must be made at the edge of one of the sheets around which the intermediate sheet is pulled out so as to prevent this edge from being torn out when the intermediate sheet is extracted. The provision of the reverse fold, together with a reinforcement of the aforementioned edge, result in an undesirable local thickening of the recording carrier, which is disadvantageous particularly when binding a plurality of such carriers into a book.

It is an object of the present invention to eliminate the aforementioned disadvantages caused by the mechanical reverse-feed barrier for the intermediate sheet.

To this end, the process described in the foregoing is distinguished by providing, by at least partial removal of the intermediate sheet, the establishment of a bond of mutually facing sheet sides which can be separated only with difficulty without destruction. Further, the recording carrier mentioned above is distinguished by first and second sheets joined together one above the other, at least one interposed intermediate sheet affecting the contrast for recording, wherein on at least one mutually facing sheet side on at least one of the sheets, an adhesive area is provided which does not substantially adhere to the intermediate sheet but does adhere to the sheet facing the adhesive area after removal of the intermediate sheet to make separation without destruction difficult.

Figure 1B:
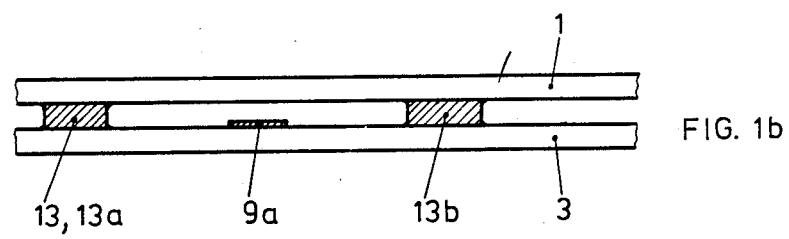
Figure 1C:
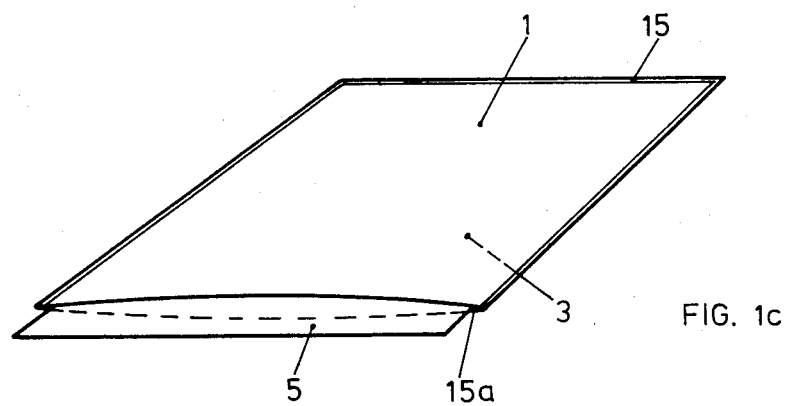
Figure 2A:
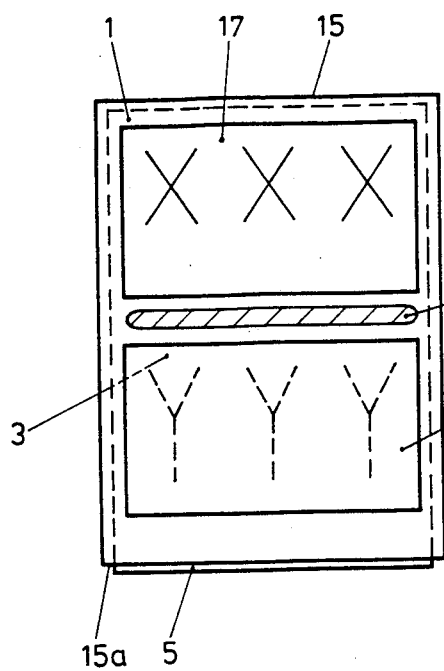
Figure 2B:
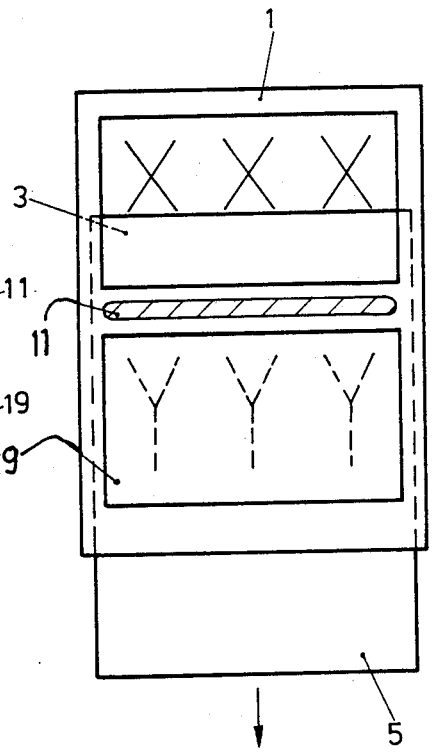
Figure 2C:
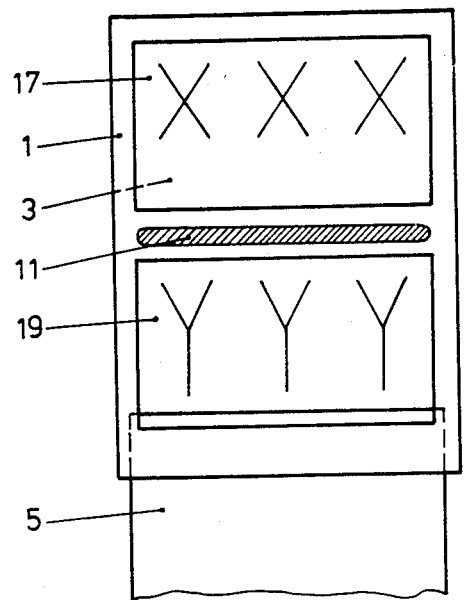
Figure 3:
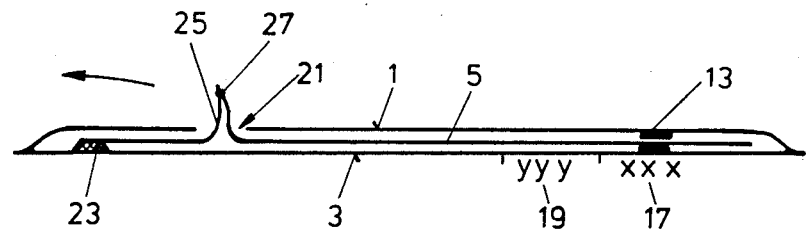
Figure 4:
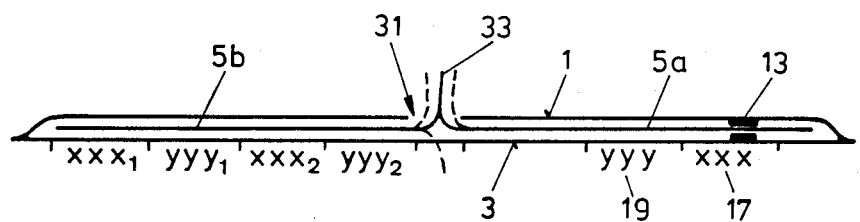
Figure 5:
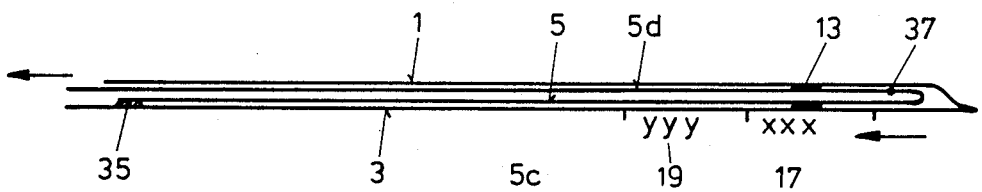

The invention will be described in greater detail hereinbelow by way of example with reference to figures wherein:

FIG. 1a shows a schematic cross section through the structure of a recording carrier according to the invention, FIG. 1b shows the schematic structure of the recording carrier according to FIG. 1a after removal of the intermediate sheet, FIG. 1c is a schematic perspective view of the recording carrier of this invention in a first embodiment version, FIGS. 2a–2c recording carrier according to the invention in a plan view, with successively removed intermediate sheet, FIG. 3 shows schematically another embodiment of a recording carrier according to the invention, FIG. 4 shows schematically a third embodiment of a recording carrier according to the invention, with three versions, FIG. 5 shows schematically a fourth embodiment of a recording carrier according to the invention.

According to FIG. 1a, a recording carrier of this invention, also called writing sheet hereinbelow, comprises two sheets, a top sheet 1 and a bottom sheet 3. An intermediate sheet 5 is provided between these two sheets 1 and 3. In principle, the intermediate sheet 5 has the initial purpose of reproducing, through an act of writing as indicated schematically by the writing tip 7, the written or drawn information applied by the writer to one sheet 1 from the outside onto at least one of the sheet sides 1a or, respectively, 3a facing the intermediate sheet 5, or generally onto one of the sheets 1, 3 on the outside and/or inside. This is illustrated schematically in FIG. 1a. By an act of writing, for example by means of the writing tip 7, such as of a ball-point pen, the sheet 1, written upon on the outside, is indented in such a way that the information contrast is recorded, for example, as a colored layer 9, at the intermediate sheet 5, and/or that, via impression of the externally written-on sheet 1, and thus also of the intermediate sheet 5, the information contrast, as illustrated at 9a, is recorded on the inside 3a of the bottom sheet 3.

Adhesive areas generally denoted by 11 are provided between the sheet surfaces 1a; 3a facing each other by way of the intermediate sheet 5. These adhesive areas, with the intermediate sheet 5 being inserted, are ineffective in that they do not adhere to the intermediate sheet 5, but they bond the two mutually facing sheet sides 1a and 3a practically inseparably together when the intermediate sheet 5 is removed, as illustrated by the arrow.

An adhesive coating 13 is generally provided on the sheet face 1a, which coating adheres to said face 1a, but not to the intermediate sheet 5. In opposition to the adhesive coating 13, a corresponding coating 13a is arranged on the side 3a of the sheet 3, adhering to the sheet 3 but not to the intermediate sheet 5. When the intermediate sheet 5 is pulled out, the two adhesive coatings, such as the aforementioned portions 13 and 13a, come into contact with each other, bond intimately, and effect a cementing together of the two sheets 1 and 3 in this adhesive zone. It is also possible, as illustrated at the righthand adhesive zone 11, to provide an adhesive coating 13b merely on one of the two sheets 1, 3, for example on sheet 1, this coating, upon removal of the intermediate sheet 5, coming into contact with the surface 3a of sheet 3 and permanently joining the two sheets, at least so that they can be separated only with difficulty without being destroyed.

The following materials can be utilized as adhesives on layers 13a, 13b:

a bicomponent glue consisting, for example, of a curing agent, such as polyamine, and a precondensate, such as an epoxy resin, a cement based on polyacrylates or polyacrylic acid esters, an anti-adhesion coating based on silicone resins, an elastomer mixture dispersed in water, nonadhesive but forming an instantaneous bond in contact with itself. Elastomers that can be used are: isoprenes, styrene-butadiene and styrene-isoprene, and natural rubber.

It will be readily understood that the adhesive areas can extend, for example with adhesive coatings, in the manner of dots or lines or flatly over relatively large zones of the sheet. However, it must be ensured that the adhesive coating is applied so that, with the intermediate sheet 5 being inserted, in spite of the latter or even because of the latter, the externally applied writing is reproduced on at least one of the two sheets 1 or 3. If the written material, reproduced only with the intermediate sheet 5 having been inserted, as shown at 9 and/or 9a, is to be visible from the outside, either as early as before removal of the intermediate sheet 5 according to FIG. 1a, or perhaps only after removal of the intermediate sheet 5 according to FIG. 1b, then zones of the sheet 1 and/or of the intermediate sheet 5 and/or of sheet 3 to be written on are designed so that this feature is attained in the configuration of FIG. 1a and/or 1b. Thus, for example, the region of sheet 1 over the zone to be written on is fashioned to be transparent at 9 or 9a.

FIG. 1c illustrates schematically in a perspective view how the sheets 1, 3, 5 are joined in a first version. The two cover sheets 1 and 3 are connected along three edges, as shown at 15, for example glued together, and form a pocket so that the intermediate sheet 5 can be extracted at the remaining, open edge 15a.

FIGS. 2a through 2c show schematically in plan view a writing sheet according to the invention as utilized, for example, for solution noting/receipting sheets.

According to FIG. 2a, the pocket of FIG. 1c is illustrated with the intermediate sheet 5 being inserted. A writing area 17 is provided, marked, for example, on sheet 1, on which the user can apply writing and, respectively, graphics. When used as a solution-noting-/receipting sheet, the user makes a notation, in correspondence with a posed problem, of the solution found by the user, in this writing area 17, indicated by means of XXX. The user then withdraws the intermediate sheet 5 from between sheets 1 and 3, as shown in FIGS. 2b and 2c. As illustrated in FIG. 2b, the solution XXX found and recorded by the user remains preserved on one of the sheet faces 1a, 3a previously facing each other via the intermediate sheet 5, according to FIGS. 1a and b. However, no alteration of the inscription can now be carried out in the region of the inscription area 17 wherein the intermediate sheet 5 has already been pulled out: The previously effected writing XXX is irreversibly recorded. On one of the sheets 1, 3, information YYY had been previously provided, such as, for example, by imprinting, but this information can be externally recognized only, or at least viewed only, if the intermediate sheet 5 vacates the thus previously inscribed information zone. This is realized in that, according to FIGS. 1a and b, this information is printed onto the sheet side 3a, in case of a solution-noting-/receipting sheet, the information is the correct solution. The intermediate sheet 5 covering this region is opaque, at least in this location, and consequently then obscures the correct solution. If the intermediate sheet is pulled out, according to the transition from FIG. 2b to 2c, and furthermore finally entirely away from between the sheets 1, 3, then the correct solution YYY becomes visible externally in accordance with FIG. 2c; for this purpose, the sheet 1 is designed, for example, in this zone 19 with the previously provided information to be transparent. As a practical feature, the inscription zone 17 and the information zone 19 are arranged so that upon removal of the intermediate sheet 5 the information zone 19 is uncovered to lend itself to external interpretation only once the intermediate sheet 5 has already left the inscription zone 17 entirely and thus correction at that location has been made impossible. An adhesion zone 11, for example with appropriate adhesive layers according to FIGS. 1a and 1b, is provided between the writing area 17 and the information area 19. This zone is generally located so that the intermediate sheet 5, after having been withdrawn from the inscription zone 17, can no longer be pushed back to that location. Once the intermediate sheet has been pulled out of the aforesaid inscription zone according to FIG. 2c, the adhesive area 11 is activated and bonds the two sheets 1 and 3 in such a way that it is only extremely difficult, or outright impossible, to separate them without causing their destruction. While the nonactivated adhesive area 11 is illustrated in FIGS. 2a and 2b by wide hatching, the activated adhesive area 11 in FIG. 2c is shown with narrow hatching. In this way, the objective is attained that perception of the previously provided information, such as the correct solution YYY, is possible only after the inscription noted by the user, for example the user's own solution XXX, can no longer be changed.

It is furthermore readily understood that additional information can be provided on the recording carrier, such as a set of instructions, the visibility of which is not affected by the position of the intermediate sheet 5, for example being printed on the outside onto sheet 1 according to FIGS. 1a, 1b, in an area not to be written on.

If the recording medium of this invention is realized in accordance with FIGS. 2, no safeguard has been provided against the user's ability to read the previously provided information in the areas 19 by lifting the sheet 1 according to FIG. 1c and the intermediate sheet 5 before inscribing the area 17, in other words, inspecting a model answer YYY before solving the problem on his own.

FIGS. 3–5, now, show embodiments of the recording carrier according to this invention making it impossible to inspect previously provided information until such time as the intermediate sheet vacates an associated section that has to be inscribed itself.

In FIG. 3, the two sheets 1 and 3 are joined together along their four edges. Between the sheets 1 and 3, the intermediate sheet 5 is inserted and, as illustrated at 23, connected, such as cemented, in the zone of one sheet edge to at least one of the sheets, in this case to sheet 3. One of the two sheets, sheet 1, exhibits an extraction slot 21 from which projects a transversely extending section 25 of the intermediate sheet 5. An area 17 to be inscribed, and an area 19 with information YYY previously provided on the inside of sheet 3, such as a model solution, are arranged in relationship to each other in such a way that the area 17 for the inscription XXX is located, with respect to the associated, previously given information YYY in area 19, more closely toward the edge zone lying in opposition to the bond 23. With the illustrated arrangement, inspection of the information YYY in the area 19 remains impossible as long as the intermediate sheet 5 covers this area. Once writing of XXX in the area 17 is completed, the intermediate sheet 5 is pulled out in the direction of the arrow by seizing the tab 25, first uncovering the area 17, whereupon the adhesive area 13 inseparably joins the two sheets 1 and 3 at that location. Only thereafter is the area 19 vacated, which contains the previously provided information YYY. If the solution entered in area 17 does not conform to the solution in area 19, correction within area 17 is no longer possible, since the intermediate sheet 5 can no longer be pushed back to that location. In order to facilitate extraction at the tab 25, a reinforcing element, such as a thin wire, can be attached, as illustrated at 27, along the intermediate sheet 5, such as by being incorporated into this sheet.

FIG. 4 shows another embodiment of the recording carrier according to the invention, preventing an untimely inspection of previously provided information YYY. As contrasted to the embodiment according to FIG. 3, the sheet 1 in this case has an extraction slot 31 in its central region, and the intermediate sheet with a projecting extraction tab 33 extends, starting at this slot 31, on both sides in between the sheets 1 and 3. The intermediate sheet 5 is in this case preferably nowhere connected to one of the sheets 1, 3. The arrangement of a recording area 17 with respect to an area 19 with associated, previously provided information, is the same as described in connection with FIG. 3. Here, too, inspection of the information in area 19, before alteration of the recording in area 17 has been blocked, is impossible. On the left-hand side of this figure, the illustration shows how the sequence of recording areas and areas with associated, previously arranged information is designed, indicated by the indexing 1 and 2, respectively. In place of a single intermediate sheet 5, it is also possible to provide two pages 5a, 5b, as shown in dashed lines, to be withdrawable separately from the slot 31, optionally also separately through respectively one slot in sheet 1 and in sheet 3; in such case, again, non-inspection of the previously provided information, though made difficult, is not made impossible.

FIG. 5 shows a third, preferred version wherein inspection of previously arranged information YYY in an area 19 is prevented before recorded information XXX in an area 17 can no longer be altered. In this case, the two sheets 1, 3 are again joined to each other along three edges. The intermediate sheet 1 is connected in the vacant edge zone to one of the sheets, as indicated at 35, e.g. cemented, and extends in between the sheets 1, 3 up to the opposite edge zone where it is folded over and extends back to the first-mentioned edge zone with the connection 35. The legs 5c, 5d of the intermediate sheet 5, running to and fro, can here be realized by two sheets with a glued zone, as indicated at 37, or they can be made of one piece. Instead of a returning sheet 5d, it is also possible to secure a differently designed extraction element to the sheet leg 5c unilaterally attached at 35, in the sheet zone lying in opposition to this point 35, such as a pull cord.

In this embodiment, inspection of the area 19 with the previously applied information YYY is impossible until the associated recording area 17 has been vacated by extracting the intermediate sheet in the direction indicated by the arrow, at least to such an extent that the adhesive area 13 makes it impossible to alter the inscription in area 17, due to the feature that then the sheets 1, 3 are glued together relatively inseparably in the area 17.

I claim:

1. A method for preventing an amendment of a notation on a notation sheet arrangement, the method comprising the steps of: providing a pocket of at least two sheets joined along at least major portions of edges thereof;

providing at least one intermediate sheet between said two sheets, said at least one intermediate sheet being adapted to generate a contrast corresponding to a notation applied on said pocket on at least one of said two sheets, said contrast being visible from outside of said pocket, applying a notation from an outside of said pocket on an area of said pocket so as to generate by said at least one intermediate sheet the contrast on at least one of said two sheets, tearing said at least one intermediate sheet out of a removal slit in said pocket and out of an area containing the contrast generated by said at least one intermediate sheet, and preventing a re-introduction of said contrast generating sheet into the area containing the contrast by automatically adhesively joining said at least two sheet of said pocket at least in one of the area containing the contrast generated by said intermediate sheet and down stream of the area containing the contrast with respect to a tearing direction of said intermediate sheet by exposing an adhesive area provided between said at least two sheets by removal of said intermediate sheet from said adhesive area.

2. The method of claim 1, wherein amendment of a notation is prevented after pre-applied information on an information area on said pocket may be viewed, the method further comprising the steps of providing said at least one intermediate sheet with a masking area and providing on said pocket a predetermined area for the notation, said masking area of said intermediate sheet making said pre-applied information unviewable when said at least one intermediate sheet is disposed in said predetermined area for notation, at least one of simultaneously and before removing said masking area of said at least one intermediate sheet from said information area of said pocket, so as to prevent by said adhesively joining of said two sheets re-introduction of intermediate sheet into said predetermined area for notation, when said masking area of said intermediate sheet has been removed from said information area.

3. The method of claim 2, further comprising the step of linking said masking area to said pocket to prevent lifting of said masking area from said information area within said pocket to gain access to said information on said information area prior to removing said at least one intermediate sheet from said predetermined area for notation.

4. The method of claim 2, wherein said information on said information area represents a solution of a problem to be solved and noted on said notation area, with the solution of said problem having to be noted on said predetermined area, wherein said solution once noted on said predetermined area may not be amended once said masking area is removed from said information area, because said at least one intermediate sheet has been previously removed from and may not be re-introduced into said predetermined area when said masking area is removed from said information area.

5. A sheet arrangement, comprising:
two cover sheets, disposed one on the other and joined to each other along at least major portions of their edges to form a pocket,
an intermediate sheet arrangement disposed within said pocket and comprising an area for providing a visible contrast on at least one of said cover sheets and visible from the outside of said pocket upon a drawing or writing action on said outside of said pocket,
a removal slit in said pocket, said intermediate sheet arrangement being extractable from said pocket through said removal slit,
adhesive means provided at and inside of said pocket, said adhesive means being disposed in an area along a removal path of said intermediate sheet arrangement, said adhesive means adhering to inner sides of said two cover sheets substantially more than to said intermediate sheet arrangement, so that at least a part of said pocket is automatically adhesively closed when said intermediate sheet arrangement is removed through said removal slit along said removal path of said intermediate sheet arrangement.

6. The sheet arrangement according to claim 5, further comprising pre-printed information provided on an information area of said pocket; said intermediate sheet arrangement including a masking area disposed in said information area for making said pre-printed information on viewable, said information area being disposed with respect to adhesive means so as to prevent an amendment of said visible contrast after said masking area of said intermediate sheet arrangement is removed from said information area.

7. The sheet arrangement according to claim 6, wherein said masking area is joined to said pocket to prevent viewing of said preprinted information by lifting said masking area prior to removing said intermediate sheet arrangement and automatically adhesively closing said pocket.

8. The sheet arrangement of claim 6, wherein preprinted information is a solution according to a problem to be solved and noted in a notation area which receives said visible contrast.

9. The sheet arrangement according to claim 8, wherein the problem to be solved is written or drawn on an area of said pocket.

10. The sheet arrangement according to claim 5, wherein said intermediate sheet arrangement is joined to one of said cover sheets adjacent to said removal slit.

11. A sheet arrangement according to claim 5, including a predetermined area for receiving said visible contrast, wherein said adhesive means are arranged so as to prevent amendment of said visible contrast after said intermediate sheet arrangement is removed from said predetermined area.

12. The sheet arrangement according to claim 5, wherein said intermediate sheet arrangement is joined to one of said cover sheets adjacent to said removal slit and a corner of said intermediate sheet arrangement opposite to said removal slit is joined to a removal element, said removal element being disposed between said corner and said removal slit.

13. The sheet arrangement according to claim 12, wherein said removal element is a sheet.

14. The sheet arrangement according to claim 5, wherein said removal slit is provided at a distance from an edge of one of said cover sheets.

15. The sheet arrangement according to claim 5, wherein said contrast generating area is formed by a carbon paper.

* * * * *